US012553857B2

(12) United States Patent
Nunome et al.

(10) Patent No.: US 12,553,857 B2
(45) Date of Patent: Feb. 17, 2026

(54) SENSOR APPARATUS AND SENSOR UNIT

(71) Applicant: NGK SPARK PLUG CO., LTD., Nagoya (JP)

(72) Inventors: Takanori Nunome, Komaki (JP); Satoshi Teramoto, Nisshin (JP); Shoichi Hasegawa, Komaki (JP); Tomomi Imaida, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 784 days.

(21) Appl. No.: 15/953,051

(22) Filed: Apr. 13, 2018

(65) Prior Publication Data

US 2018/0299404 A1    Oct. 18, 2018

(30) Foreign Application Priority Data

Apr. 14, 2017 (JP) .................................. 2017-080547

(51) Int. Cl.
*G01N 27/416* (2006.01)
*G01N 27/04* (2006.01)
(Continued)

(52) U.S. Cl.
CPC ....... *G01N 27/4163* (2013.01); *G01N 27/041* (2013.01); *G01N 27/045* (2013.01);
(Continued)

(58) Field of Classification Search
CPC ............. G01N 27/123; G01N 27/4067; G01N 27/4073; G01N 27/41; G01N 27/4175;
(Continued)

(56) References Cited

U.S. PATENT DOCUMENTS 4,472,262 A   9/1984 Kondo et al.
4,609,452 A * 9/1986 Shimomura ......... G01N 27/417
                                                    204/412

(Continued)

FOREIGN PATENT DOCUMENTS

DE    32 19 610 C2    7/1988
DE    198 19 462 A1  11/1999
(Continued)

OTHER PUBLICATIONS

Don Koks, Can you take the logarithm of a dimensioned quantity? (2017) (Year: 2017).*

(Continued)

*Primary Examiner* — James Lin
*Assistant Examiner* — Vivian A Tran
(74) *Attorney, Agent, or Firm* — Sughrue Mion, PLLC

(57) ABSTRACT

A sensor control apparatus (1) calculates the concentration of oxygen using a gas sensor (3) including a sensor element (11) and a heater (12). The sensor control apparatus (1) repeatedly obtains internal resistance data representing an internal resistance value Rpvs of an oxygen-ion-conductive solid electrolyte body (14) and pump current data representing the value of pump current Ip which flows between a pair of pump electrodes (15) and (16) and whose value varies with the concentration of oxygen. The sensor control apparatus (1) corrects the value of the pump current Ip based on the internal resistance value Rpvs, a target internal resistance value, and a derivative value dRpvs/dt calculated based on a plurality of the repeatedly obtained internal resistance values Rpvs.

3 Claims, 5 Drawing Sheets

(51) Int. Cl.
*G01N 27/12* (2006.01)
*G01N 27/406* (2006.01)
*G01N 27/407* (2006.01)
*G01N 27/41* (2006.01)
*G01N 27/417* (2006.01)

(52) U.S. Cl.
CPC ....... *G01N 27/123* (2013.01); *G01N 27/4065* (2013.01); *G01N 27/4067* (2013.01); *G01N 27/4073* (2013.01); *G01N 27/41* (2013.01); *G01N 27/4175* (2013.01)

(58) Field of Classification Search
CPC ................ G01N 27/02; G01N 27/028; G01N 27/04–041; G01N 27/045–046; G01N 27/14–18; G01N 27/4163–4165; G01N 27/406–4065; G01N 27/407–4078; G01N 27/417; G01N 27/419
See application file for complete search history.

(56) References Cited

U.S. PATENT DOCUMENTS

| | | | |
|---|---|---|---|
| 4,609,453 A * | 9/1986 | Shimomura | G01N 27/417 204/412 |
| 6,082,176 A * | 7/2000 | Kondo | G01N 27/407 73/23.31 |
| 6,136,170 A * | 10/2000 | Inoue | G01N 27/4075 204/426 |
| 6,214,207 B1 | 4/2001 | Miyata et al. | |
| 6,294,075 B1 | 9/2001 | Poggio et al. | |
| 6,645,367 B1 | 11/2003 | Zhang et al. | |
| 2001/0000598 A1 * | 5/2001 | Miyata | G01N 27/4074 205/780.5 |
| 2002/0162743 A1 | 11/2002 | Inagaki | |
| 2010/0108540 A1 | 5/2010 | Kato et al. | |
| 2010/0205938 A1 | 8/2010 | Ding | |
| 2011/0132775 A1 * | 6/2011 | Kawai | F02D 41/2432 204/412 |
| 2011/0168574 A1 * | 7/2011 | Sasaki | G01N 27/419 204/406 |
| 2012/0199478 A1 | 8/2012 | Sasaki | |
| 2012/0234697 A1 * | 9/2012 | Onogi | G01N 27/4074 205/775 |
| 2014/0014535 A1 * | 1/2014 | Onogi | F02D 41/146 205/784 |
| 2014/0048415 A1 | 2/2014 | Kato et al. | |
| 2018/0017537 A1 | 1/2018 | Lemire et al. | |
| 2018/0059045 A1 | 3/2018 | Fey | |

FOREIGN PATENT DOCUMENTS

| | | |
|---|---|---|
| DE | 600 01 005 T2 | 7/2003 |
| DE | 102 02 859 A1 | 8/2003 |
| DE | 697 32 582 T2 | 5/2006 |
| DE | 10 2009 052 158 A1 | 6/2010 |
| DE | 10 2010 006 997 A1 | 8/2010 |
| DE | 10 2012 201 587 A1 | 8/2012 |
| DE | 10 2015 205 971 A1 | 7/2015 |
| DE | 10 2015 207 880 A1 | 11/2016 |
| EP | 0 152 293 A2 | 8/1985 |
| EP | 0 153 830 A1 | 9/1985 |
| EP | 0 851 225 A2 | 7/1998 |
| EP | 0 859 232 A2 | 8/1998 |
| EP | 0 884 587 A1 | 12/1998 |
| EP | 0 937 979 A2 | 8/1999 |
| EP | 2 330 409 A1 | 6/2011 |
| EP | 2 354 784 A1 | 8/2011 |
| EP | 1 202 048 B1 | 10/2013 |
| JP | 11-304758 A | 11/1999 |
| JP | 2000-65781 A | 3/2000 |
| JP | 2004-125482 A | 4/2004 |
| JP | 2007-101485 A | 4/2007 |

OTHER PUBLICATIONS

Office Action issued May 7, 2024 by the German Patent Office in German Patent Application No. 102018108493.5.

* cited by examiner

SENSOR APPARATUS AND SENSOR UNIT

BACKGROUND OF THE INVENTION

1. Field of the Invention

The present disclosure relates to a sensor apparatus and a sensor unit which calculate the concentration of a particular gas using a gas sensor including a sensor element and a heater.

2. Description of the Related Art

As disclosed in Patent Document 1, a sensor apparatus has been known which uses a gas sensor including a sensor element for detecting a gas concentration of a particular gas contained in a gas under measurement and a heater for heating the sensor element to an activation temperature so as to bring the sensor element into a gas concentration detectable state. The sensor apparatus corrects the pump current of the gas sensor based on its standard temperature characteristic. The standard temperature characteristic represents, by means of a linear equation, the relation between a correction amount of the pump current and the element temperature calculated from the internal resistance of the sensor element.

[Patent Document 1] Japanese Patent Application Laid-Open (kokai) No. H11-304758

3. Problems to be Solved by the Invention

In the case where correction is performed using a relational expression which represents a one-to-one correspondence between the element temperature and the correction amount, the accuracy in detecting the gas concentration by the gas sensor may deteriorate.

SUMMARY OF THE INVENTION

It is therefore an object of the present disclosure to improve the accuracy in detecting a gas concentration by the gas sensor.

The above object of the present disclosure has been achieved in a first aspect by providing a sensor apparatus which calculates the concentration of a particular gas contained in a gas under measurement using a gas sensor which includes a sensor element and a heater for heating the sensor element, the sensor element including at least one cell having a solid electrolyte body and a pair of electrodes disposed on the solid electrolyte body.

The sensor apparatus comprises an obtainment section and a correction section.

The obtainment section is configured to repeatedly obtain resistance information representing an internal resistance value of the solid electrolyte body and current information representing a concentration detection current which flows between the pair of electrodes and whose value varies with the concentration of the particular gas.

The correction section is configured to correct the value of the concentration detection current, which is represented by the current information obtained by the obtainment section, based on the internal resistance value, which is represented by the internal resistance information obtained by the obtainment section, a target internal resistance value, and a resistance change rate which is calculated based on a plurality of internal resistance values represented by a plurality of resistance information data sets repeatedly obtained by the obtainment section. Notably, a temperature at which the solid electrolyte body is maintained by means of heating by the heater so as to enable the sensor element to detect the concentration of the particular gas is defined as a target temperature, a value of the internal resistance corresponding to the target temperature is defined as the target internal resistance value, and the amount of change in the internal resistance per unit time is defined as the resistance change rate.

The sensor apparatus of the present disclosure configured as described above corrects the value of the concentration detection current whose value varies with the concentration of the particular gas using not only the difference between the target internal resistance value and the value of the internal resistance of the solid electrolyte body of the sensor element, but also the amount of change in the internal resistance per unit time. Namely, the sensor apparatus of the present disclosure corrects the value of the concentration detection current in consideration of not only the influence exerted on the concentration detection current in a static state in which a constant difference is maintained between the value of the internal resistance and the target internal resistance value, but also the influence exerted on the concentration detection current in a transitional state in which the internal resistance is still changing. Therefore, the sensor apparatus of the present disclosure can improve the accuracy in detecting the gas concentration by the gas sensor.

In a preferred embodiment of the sensor apparatus above, the correction section corrects the value of the concentration detection current in accordance with the following equation (1).

$$Ipo = Ip - \left[ \exp\left\{ \frac{a}{\ln(Rpvs)} + b \right\} - \exp\left\{ \frac{a}{\ln(Rpvs\_t)} + b \right\} \right] - \beta \frac{dRpvs}{dt} \quad (1)$$

wherein Ip represents the value of the concentration detection current represented by the current information, Rpvs represents the value of the internal resistance represented by the resistance information, Rpvs_t represents the target internal resistance value, dRpvs/dt represents the resistance change rate, Ipo represents the value of the concentration detection current corrected by the correction section, and a, b, and β represent coefficients set in advance as constants.

In another preferred embodiment of the sensor apparatus above, the correction section corrects the value of the concentration detection current in accordance with the following equation (2).

$$Ipo = Ip - \alpha \times \Delta Rpvs - \beta \frac{dRpvs}{dt} \quad (2)$$

wherein Ip represents the value of the concentration detection current represented by the current information, ΔRpvs represents the difference between the target internal resistance value and the value of the internal resistance represented by the resistance information, dRpvs/dt represents the resistance change rate, Ipo represents the value of the concentration detection current corrected by the correction section, and α and β represent coefficients set in advance as constants.

In a second aspect, the above object of the present disclosure has been achieved by providing a sensor unit comprising: a gas sensor which includes a sensor element and a heater for heating the sensor element, the sensor element including at least one cell having a solid electrolyte body and a pair of electrodes disposed on the solid electrolyte body; and the sensor apparatus above.

Since the sensor unit of the present disclosure configured as described above includes the sensor apparatus of the present disclosure, the same effect as that of the sensor apparatus of the present disclosure can be obtained.

DESCRIPTION OF REFERENCE NUMERALS

Figure 1:
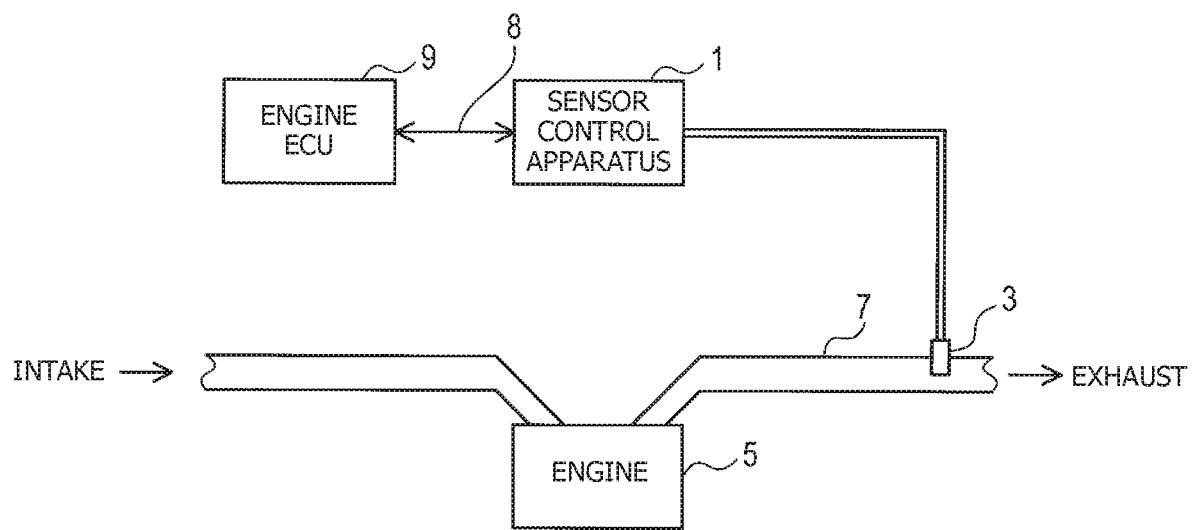
FIG. 1 is a diagram schematically showing the configuration of a system which includes a sensor control apparatus 1 as a component.

Reference numerals used to identify various features in the drawings include the following.
1 . . . sensor control apparatus, 3 . . . gas sensor, 11 . . . sensor element, 12 . . . heater, 13 . . . pump cell, 14 . . . oxygen-ion-conductive solid electrolyte body, 15, 16 . . . pump electrode

DETAILED DESCRIPTION OF THE PREFERRED EMBODIMENTS

An embodiment of the present disclosure will now be described with reference to the drawings. However, the present invention should not be construed as being limited thereto.

A sensor control apparatus 1 of the present embodiment is mounted on a vehicle and controls a gas sensor 3 as shown in FIG. 1.

The sensor control apparatus 1 is configured such that, through a communication line 8, the sensor control apparatus 1 can transmit data to and receive data from an electronic controller 9 which controls an engine 5. In the following description, the electronic controller 9 will be referred to as an engine ECU 9. ECU is an abbreviation for "Electronic Control Unit."

The gas sensor 3 is attached to an exhaust pipe 7 of the engine 5 and detects the concentration of oxygen in exhaust gas over a wide range. The gas sensor 3 is also known as a "linear lambda sensor."

Figure 2:
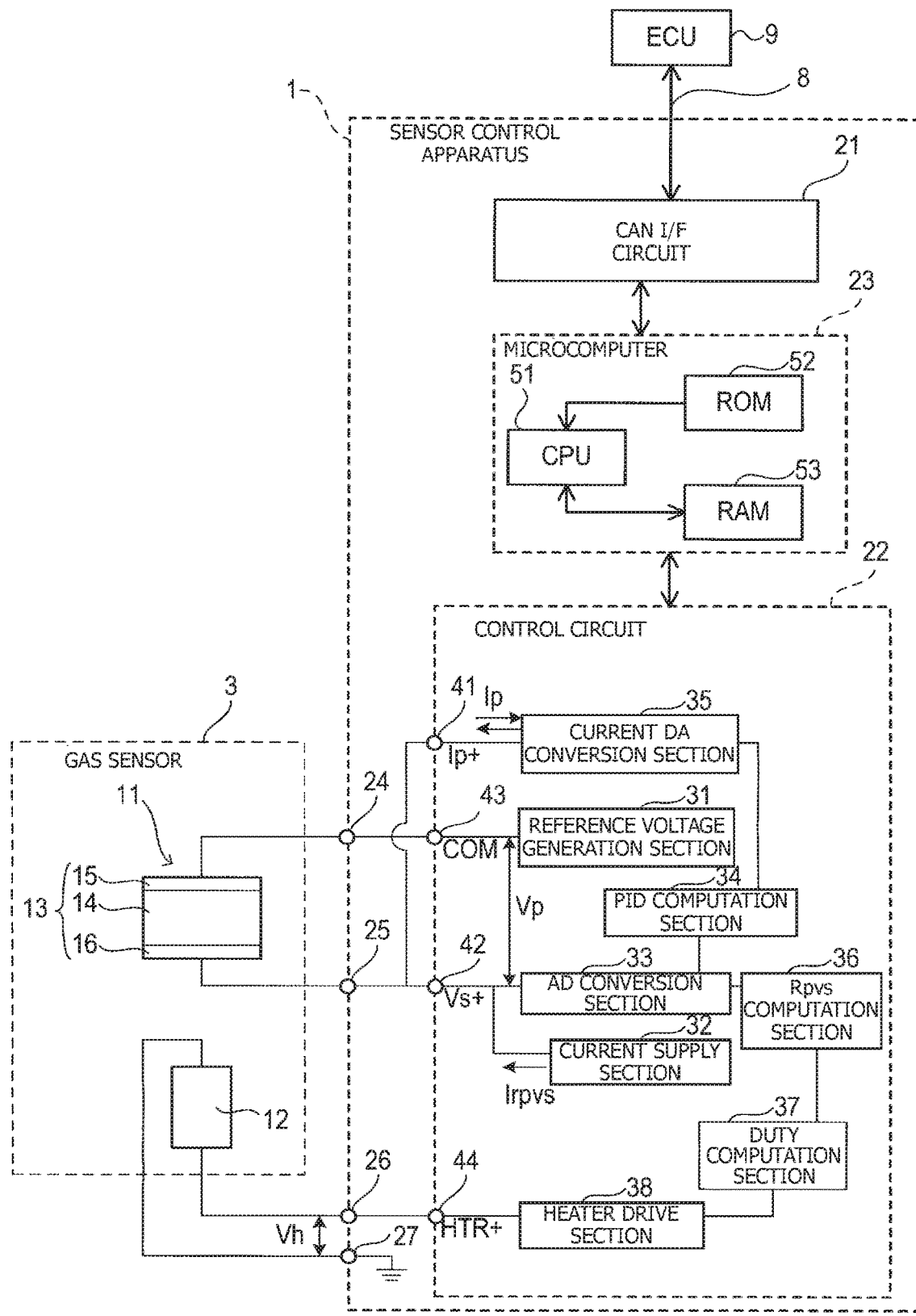
FIG. 2 is a diagram schematically showing the configurations of the sensor control apparatus 1 and a gas sensor 3.

As shown in FIG. 2, the gas sensor 3 includes a sensor element 11 and a heater 12.

The sensor element 11 includes a pump cell 13. The pump cell 13 includes an oxygen-ion-conductive solid electrolyte body 14 formed of partially stabilized zirconia and having a plate-like shape; and pump electrodes 15 and 16 provided on front and back surfaces, respectively, of the oxygen-ion-conductive solid electrolyte body 14 and formed mainly of platinum.

Notably, although the sensor element 11 is schematically shown in FIG. 2, the sensor element 11 has an unillustrated measurement chamber and an unillustrated reference oxygen chamber. The pump electrode 15 is exposed to the measurement chamber, and the pump electrode 16 is exposed to the reference oxygen chamber. A gas under measurement is introduced from outside the sensor element 11 into the measurement chamber through an unillustrated porous diffusion layer. The atmospheric air which serves as a reference gas is introduced from the outside of the sensor element 11 into the reference oxygen chamber.

The sensor element 11 is an oxygen sensor element which detects the concentration of oxygen by a so-called limiting-current method. An output characteristic which represents the relation between voltage applied between the paired pump electrodes 15 and 16 (hereinafter referred to as "sensor element voltage Vp) and current flowing between the paired pump electrodes 15 and 16 (hereinafter referred to as "pump current Ip) has a proportional region and a flat region. In the proportional region, the pump current Ip changes in proportion to an increase in the sensor element voltage Vp. In the flat region, even when the sensor element voltage Vp changes, the pump current Ip substantially does not change and remains at a constant level.

The flat region is a region in which the characteristic curve becomes flat and parallel to the voltage axis of a graph showing the output characteristic; namely, a region of limiting current where the pump current Ip becomes constant (hereinafter referred to as the "limiting-current region").

It is known that the pump current Ip in the limiting-current region assumes a value corresponding to the oxygen concentration and that the higher the oxygen concentration, the larger the pump current Ip. Namely, the higher the oxygen concentration in the exhaust gas (namely, the greater the degree to which the air-fuel ratio shifts toward the lean side), the larger the limiting current of the pump current Ip. Also, the lower the oxygen concentration in the exhaust gas (namely, the greater the degree to which the air-fuel ratio shifts toward the rich side), the smaller the limiting current of the pump current Ip. Therefore, the oxygen concentration in the exhaust gas can be detected over a wide range by applying a sensor element voltage Vp corresponding to the limiting-current region to the pump cell 13 of the sensor element 11 and measuring the pump current Ip obtained by applying the sensor element voltage Vp.

The heater 12 is formed of a material containing alumina as a main component, and includes a heating resistor which is formed of a material containing platinum as a main component and is embedded therein. The heater 12 is energized and controlled by electric power supplied from the sensor control apparatus 1 such that the temperature of the sensor element 11 becomes equal to an activation temperature. Opposite ends of the heating resistor are electrically connected to the sensor control apparatus 1. Notably, the gas sensor 3 enters a gas detectable state when the sensor element 11 is activated as a result of heating by the heater 12.

The sensor control apparatus 1 includes a CAN interface circuit 21 (hereinafter referred to as the "CAN I/F circuit 21"), a control circuit 22, a microcomputer 23, and connection terminals 24, 25, 26, and 27. CAN is an abbreviation for "Controller Area Network" and is a registered trademark.

Through the communication line 8, the CAN I/F circuit 21 exchanges data (through transmission and reception of data) with the engine ECU 9 in accordance with a CAN communication protocol.

The control circuit 22 is a realized by an integrated circuit for a specific application (namely, ASIC). ASIC is an abbreviation for "Application Specific Integrated Circuit."

The control circuit 22 includes a reference voltage generation section 31, a current supply section 32, an analog-to-digital conversion section 33 (hereinafter referred to as the "AD conversion section 33"), a proportional-integral-derivative (PID) computation section 34, a current digital-to-analog conversion section 35 (hereinafter referred to as the "current DA conversion section 35"), an Rpvs computation section 36, a duty computation section 37, and a heater drive section 38. Also, the control circuit 22 has a pump current terminal 41 (hereinafter referred to as the "Ip+ terminal 41"), a detection voltage terminal 42 (hereinafter referred to as the "Vs+ terminal 42"), a common terminal 43 (hereinafter referred to as the "COM terminal 43"), and a heater terminal 44 (hereinafter referred to as the "HTR+ terminal 44").

The Ip+ terminal 41 and the Vs+ terminal 42 are connected to the connection terminal 25 of the sensor control apparatus 1. The COM terminal 43 is connected to the connection terminal 24 of the sensor control apparatus 1. The pump electrodes 15 and 16 of the sensor element 11 are respectively connected to the connection terminals 24 and 25 of the sensor control apparatus 1. The HTR+ terminal 44 is connected to the connection terminal 26 of the sensor control apparatus 1. The opposite ends of the heater 12 are respectively connected to the connection terminals 26 and 27 of the sensor control apparatus 1. Notably, the connection terminal 27 is grounded.

The reference voltage generation section 31 generates a reference voltage to be applied to the COM terminal 43. In the present embodiment, the reference voltage is 2.7 V.

The current supply section 32 supplies a pulse current Irpvs to the sensor element 11 through the Vs+ terminal 42. The pulse current Irpvs is used for detecting the internal resistance of the pump cell 13. Notably, the current supply section 32 does not supply the pulse current Irpvs at all times. In response to an instruction from the microcomputer 23, the current supply section 32 regularly supplies the pulse current Irpvs over a predetermined period.

The AD conversion section 33 converts the voltage value of an analog signal input through the Vs+ terminal 42 to digital data and outputs the digital data to the PID computation section 34 and the Rpvs computation section 36.

Based on the digital data input from the AD conversion section 33, the PID computation section 34 performs PID computation for PID control of the pump current Ip such that the difference between the voltage at the Vs+ terminal 42 and the voltage at the COM terminal 43 becomes equal to a control reference voltage set in advance. In the present embodiment, the control reference voltage is 400 mV. The PID computation section 34 calculates a value of the pump current Ip through PID computation and outputs digital data representing this current value to the current DA conversion section 35.

The current DA conversion section 35 supplies a current to the sensor element 11 through the Ip+ terminal 41, the current having a current value represented by the digital data input from the PID computation section 34.

The Rpvs computation section 36 executes a computation process for calculating the internal resistance value Rpvs of the pump cell 13 based on the digital data input from the AD conversion section 33 when the current supply section 32 is supplying the pulse current Irpvs. The Rpvs computation section 36 outputs digital data representing the internal resistance value Rpvs to the duty computation section 37.

Based on the digital data input from the Rpvs computation section 36, the duty computation section 37 calculates a heater heat generation amount required to maintain the temperature of the sensor element 11 at a sensor target temperature set in advance. Based on the calculated heater heat generation amount, the duty computation section 37 calculates the duty ratio of electric power supplied to the heater 12. Further, the duty computation section 37 generates a PWM control signal corresponding to the calculated duty ratio and outputs the PWM control signal to the heater drive section 38. PWM is an abbreviation for "Pulse Width Modulation."

Based on the PWM control signal input from the duty computation section 37, the heater drive section 38 performs PWM control so as to control the voltage Vh supplied between the opposite ends of the heater 12 to thereby cause the heater 12 to generate heat.

The microcomputer 23 includes a central processing unit or CPU 51 (or processor), a read-only memory or ROM 52, and a random-access memory or RAM 53. The various functions of the microcomputer are realized by a program which is stored in a non-transitory tangible recording medium and executed by the CPU 51. In this example, the ROM 52 corresponds to the non-transitory tangible recording medium storing the program. Also, a method corresponding to the program is performed as a result of execution of the program. Notably, the sensor control apparatus 1 may include a single microcomputer or a plurality of microcomputers. Also, some or all of the functions of the microcomputer 23 may be realized by hardware; for example, by a single integrated circuit (IC) or a plurality of ICs.

The CPU 51 executes a current correction process for correcting the pump current Ip based on the program stored in the ROM 52.

Next, the steps of the current correction process executed by the CPU 51 of the microcomputer 23 will be described. The current correction process is a process which is repeatedly executed when the microcomputer 23 is operating.

Figure 3:
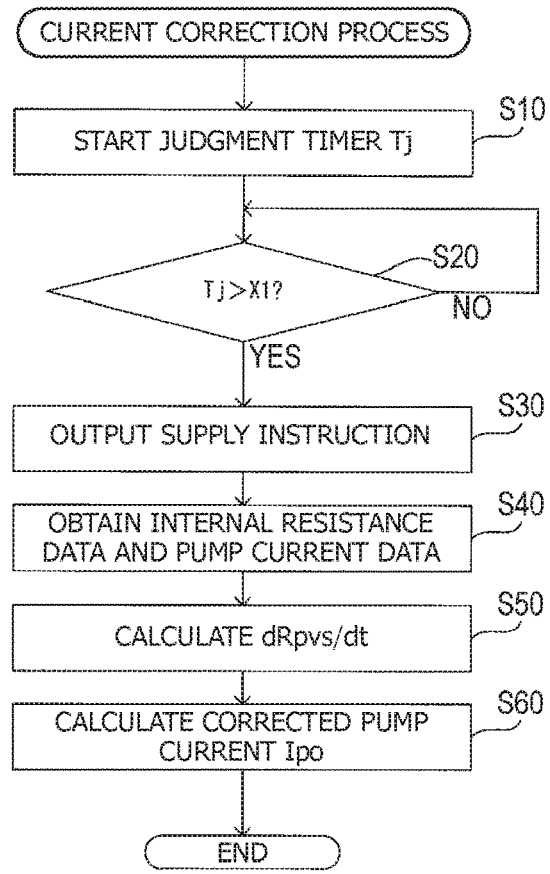
FIG. 3 is a flowchart showing a current correction process.

When the current correction process is executed, as shown in FIG. 3, first in S10, the CPU 51 starts a judgment timer Tj provided in the RAM 53. The judgment timer Tj is a timer whose value is incremented at intervals of, for example, 10 ms. Therefore, when the judgment timer Tj is started, its value is incremented from 0 (namely, one is added to the value of the judgment timer Tj).

In S20, the CPU 51 judges whether or not the value of the judgment timer Tj is greater than a measurement judgment value X1 set in advance. In the present embodiment, the measurement judgment value X1 is a value corresponding to, for example, 100 ms. In the case where the value of the judgment timer Tj is equal to or less than the measurement judgment value X1, the CPU 51 waits until the value of the judgment timer Tj becomes greater than the measurement judgment value X1 by repeating the process of S20.

Meanwhile, in the case where the value of the judgment timer Tj is greater than the measurement judgment value X1, in S30, the CPU 51 outputs a supply instruction to the control circuit 22 so as to instruct the current supply section 32 to supply the pulse current Irpvs. As a result, the current supply section 32 of the control circuit 22 supplies the pulse current Irpvs to the sensor element 11 only once.

In S40, the CPU 51 obtains data showing the latest internal resistance value Rpvs calculated by the Rpvs computation section 36 (hereinafter referred to as the "internal resistance data") and data showing the latest pump current Ip calculated by the PID computation section 34 (hereinafter referred to as the "pump current data") from the control circuit 22, and stores them in the RAM 53.

In S50, the CPU 51 calculates an internal resistance time derivative value dRpvs/dt (hereinafter referred to as the "derivative value dRpvs/dt"). Specifically, the CPU 51 retrieves, as an internal resistance value Rpvs (1), one of the plurality of internal resistance values Rpvs stored in the RAM 53 which is the latest (the first latest) in terms of the timing at which the internal resistance value Rpvs was obtained in S40, and retrieves, as an internal resistance value Rpvs(n), another of the plurality of internal resistance values Rpvs which is the n-th latest in terms of the timing at which the internal resistance value Rpvs was obtained in S40. Notably, n is an integer equal to or greater than 2. The time interval between the timing at which the internal resistance value Rpvs (1) was obtained and the timing at which the internal resistance value Rpvs(n) was obtained is represented by ΔTd. In S50, the CPU 51 calculates the derivative value dRpvs/dt in accordance with the following equation (3).

$$dRpvs/dt = \{Rpvs(1) - Rpvs(n)\}/\Delta Td \quad (3)$$

Next, in step S60, the CPU 51 obtains a corrected pump current Ipo by correcting the pump current Ip in accordance with the following equation (1). Subsequently, the CPU 51 ends the present execution of the current correction process. Notably, coefficients a, b, and β in equation (1) are constants set in advance. Methods for setting the coefficients a, b, and β will be described below. A target internal resistance value Rpvs_t in equation (1) is an internal resistance value Rpvs corresponding to the above-described sensor target temperature.

$$Ipo = Ip - \left[ \exp\left\{ \frac{a}{\ln(Rpvs)} + b \right\} - \exp\left\{ \frac{a}{\ln(Rpvs\_t)} + b \right\} \right] - \beta \frac{dRpvs}{dt} \quad (1)$$

Next, the method for setting the coefficients a and b will be described

Figure 4:
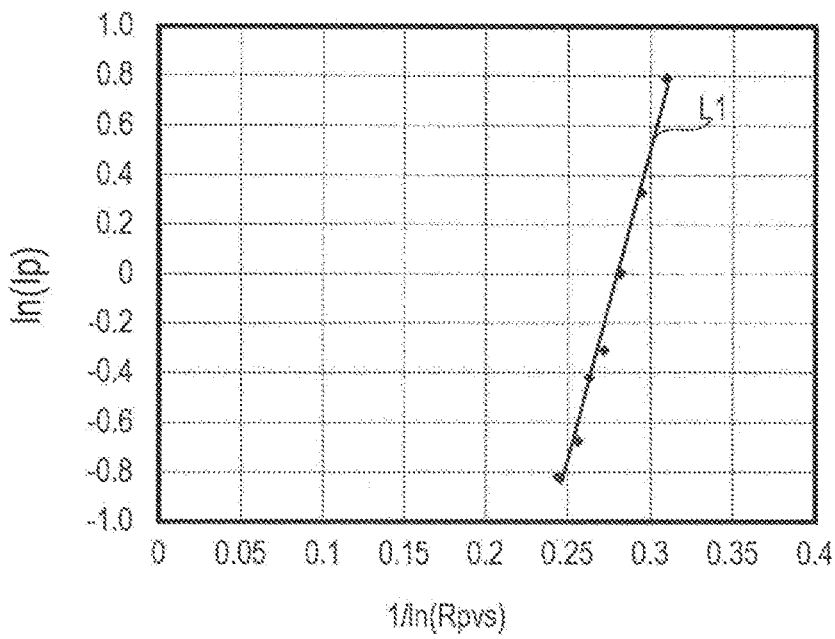
FIG. 4 is a graph showing the relation between In(Ip) and 1/In(Rpvs).

As shown in FIG. 4, the relation between the logarithm of the pump current Ip (hereinafter denoted as ln(Ip)) and the reciprocal of the logarithm of the internal resistance value Rpvs (hereinafter denoted as 1/ln(Rpvs)) can be represented by a linear equation as shown by a straight line L1. Namely, the relation between ln(Ip) and 1/ln(Rpvs) is represented by the following equation (4). Notably, coefficients A and B in the following equation (4) are the slope and intercept, respectively, of the linear equation which represents the straight line L1. In the case of the straight line L1 of FIG. 4, the value of the coefficient A representing the slope is about 25.1, and the value of the coefficient B representing the intercept is about 7.0.

$$\ln(Ip) = A \times \{1/\ln(Rpvs)\} + B \quad (4)$$

The following equation (5) of the pump current Ip is obtained from equation (4).

$$Ip = \exp[A \times \{1/\ln(Rpvs)\} + B] \quad (5)$$

Through comparison between the bracketed function of the right side of equation (1) and the right side of equation (5), it can be understood that the coefficient a in equation (1) corresponds to the coefficient A in equation (5) and the coefficient b in equation (1) corresponds to the coefficient B in equation (5).

Accordingly, the coefficients a and b in equation (1) can be set by measuring the pump current Ip and the internal resistance value Rpvs in the gas sensor 3 and representing the relation between ln(Ip) and 1/ln(Rpvs) by a linear equation as shown in FIG. 4.

Next, the method for setting the coefficient β will be described.

Figure 5:
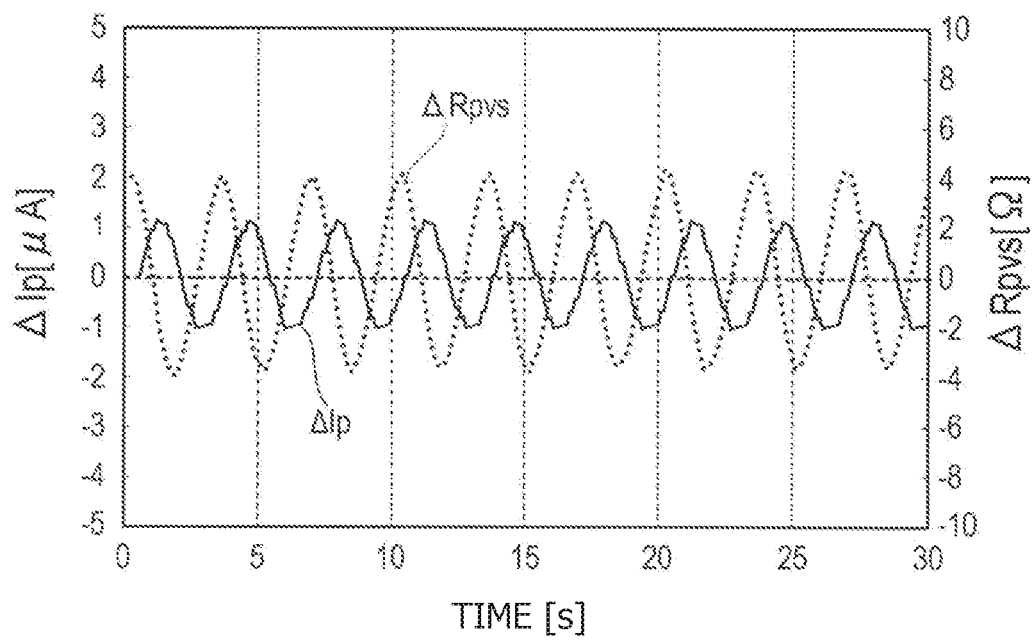
FIG. 5 is a graph showing changes in ΔRpvs and ΔIp with time.

FIG. 5 is a graph which shows changes in the internal resistance difference ΔRpvs and the pump current difference ΔIp with time in the case where the internal resistance value Rpvs is periodically increased and decreased with the target internal resistance value Rpvs_t used as a reference. The internal resistance difference ΔRpvs is a value obtained by subtracting the target internal resistance value Rpvs_t from the internal resistance value Rpvs. The pump current difference ΔIp is a value obtained by subtracting the pump current Ip at the target internal resistance value Rpvs_t from the pump current Ip at the internal resistance value Rpvs.

As shown in FIG. 5, as the internal resistance difference ΔRpvs increases and decreases periodically, the pump current difference ΔIp also increases and decreases periodically.

Figure 6:
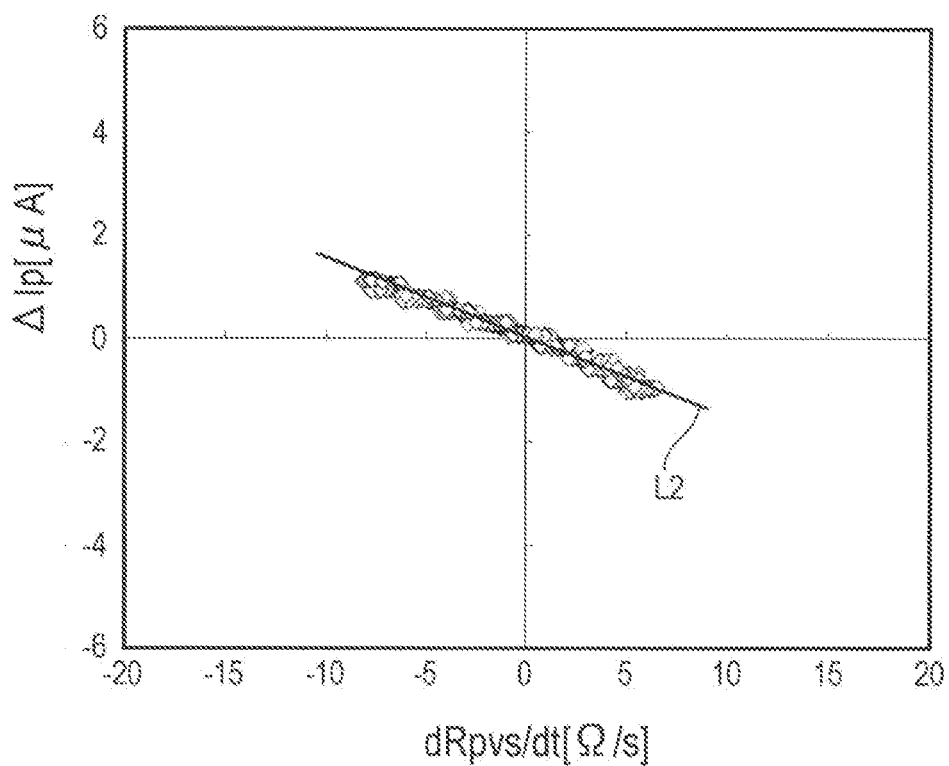
FIG. 6 is a graph showing the relation between dRpvs/dt and ΔIp.

FIG. 6 is a graph showing the relation between the pump current difference ΔIp and the above-described derivative value dRpvs/dt which shows the amount of change in the internal resistance value Rpvs per unit time.

As shown in FIG. 6, the relation between the derivative value dRpvs/dt and the pump current difference ΔIp can be represented by a linear equation as shown by a straight line L2. Namely, the relation between the derivative value dRpvs/dt and the pump current difference ΔIp is represented by the following equation (6). Notably, coefficients C and D in the following equation (6) are the slope and intercept, respectively, of the linear equation which represents the straight line L2. In the case of the straight line L2 of FIG. 6, the value of the coefficient C representing the slope is about −0.15, and the value of the coefficient D representing the intercept is 0 (about 0).

$$\Delta Ip = C \times dRpvs/dt + D \quad (6)$$

Through comparison between the rightmost function (namely, β×dRpvs/dt) of the right side of equation (1) and the right side of equation (6), it can be understood that the coefficient β in equation (1) corresponds to the coefficient C in equation (6).

Accordingly, the coefficient β in equation (1) can be set by measuring the pump current Ip and the internal resistance value Rpvs in the gas sensor 3, while periodically increasing and decreasing the internal resistance value Rpvs, and representing the relation between the derivative value dRpvs/dt and the pump current difference ΔIp by a linear equation as shown in FIG. 6.

Figure 7:
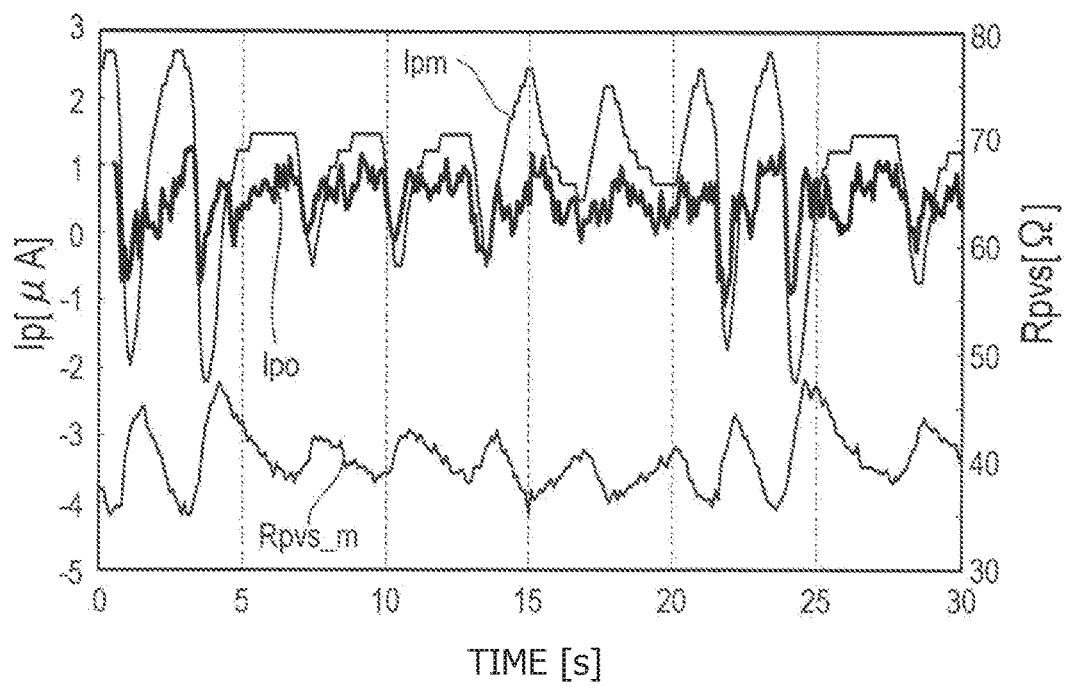
FIG. 7 is a graph showing changes in Ipm, Rpvs_m, and Ipo with time.

FIG. 7 is a graph which shows time-course changes in the measured value Ipm of the pump current Ip (hereinafter referred to as the "measured current value Ipm") and the measured value Rpvs_m of the internal resistance value Rpvs (hereinafter referred to as the "measured resistance value Rpvs_m"), and the corrected pump current Ipo calculated in accordance with equation (1).

As shown in FIG. 7, as compared with the variation of the measured current value Ipm stemming from the variation of the internal resistance value Rpvs, the variation of the corrected pump current Ipo stemming from the variation of the internal resistance value Rpvs is small. This shows that the accuracy in detecting the oxygen concentration is improved.

The sensor control apparatus 1 configured as described above calculates the concentration of oxygen contained in the exhaust gas through use of the gas sensor 3 including the sensor element 11 and the heater 12 for heating the sensor element 11. The sensor element 11 includes the pump cell 13 having the oxygen-ion-conductive solid electrolyte body 14 and the paired pump electrodes 15 and 16 disposed on the oxygen-ion-conductive solid electrolyte body 14.

The sensor control apparatus 1 repeatedly obtains the internal resistance data representing the internal resistance value Rpvs of the oxygen-ion-conductive solid electrolyte body 14 and the pump current data representing the value of the pump current Ip which flows between the paired pump electrodes 15 and 16 and whose value varies with the concentration of oxygen.

The sensor control apparatus 1 corrects the value of the pump current Ip represented by the obtained pump current data based on the internal resistance value Rpvs represented by the obtained internal resistance data, the target internal resistance value Rpvs_t, and the derivative value dRpvs/dt calculated based on the plurality of internal resistance values Rpvs represented by the plurality of internal resistance data sets that has been repeatedly obtained.

As described above, the sensor control apparatus 1 corrects the value of the pump current Ip using not only the difference between the target internal resistance value Rpvs_t and the internal resistance value Rpvs of the oxygen-ion-conductive solid electrolyte body 14 of the sensor element 11, but also the amount of change in the internal resistance per unit time. Namely, the sensor control apparatus 1 corrects the value of the pump current Ip in consideration of not only the influence exerted on the pump current Ip in a static state in which a constant difference is maintained between the internal resistance value Rpvs and the target internal resistance value Rpvs_t, but also the influence exerted on the pump current Ip in a transitional state (dynamic state) in which the internal resistance is changing. Therefore, the sensor control apparatus 1 can improve the accuracy in detecting the gas concentration by the gas sensor 3.

In the above-described embodiment, the sensor control apparatus 1 corresponds to the sensor apparatus; the oxygen-ion-conductive solid electrolyte body 14 corresponds to the solid electrolyte body; the pump electrodes 15 and 16 correspond to the pair of electrodes; and the pump cell 13 corresponds to the cell in the claims appended hereto.

The exhaust gas corresponds to the gas under measurement; oxygen corresponds to the particular gas; the pump current Ip corresponds to the concentration detection current; the internal resistance data corresponds to the resistance information; and the pump current data corresponds to the current information in the claims appended hereto.

S10 to S40 correspond to the processing of the obtainment section; and S50 to S60 correspond to the processing of the correction section in the claims appended hereto.

The sensor target temperature corresponds to the target temperature, the derivative value dRpvs/dt corresponds to the resistance change speed, and the sensor control apparatus 1 and the gas sensor 3 correspond to the sensor unit in the claims appended hereto.

One embodiment of the present disclosure has been described above, but the present disclosure is not limited to the above-described embodiment and can be embodied in various other forms.

For example, in the above-described embodiment, the pump current Ip is corrected in accordance with equation (1). However, the pump current Ip may be corrected in accordance with equation (2). Notably, a coefficient a in equation (2) is a constant set in advance.

$$Ipo = Ip - \alpha \times \Delta Rpvs - \beta \frac{dRpvs}{dt} \quad (2)$$

Next, a method of setting the coefficient a will be described.

Figure 8:
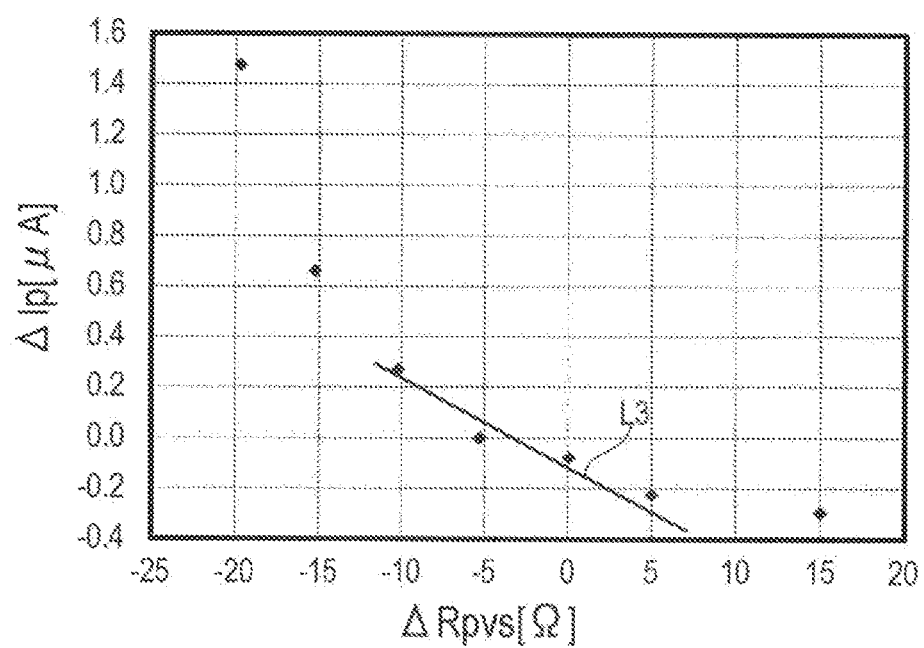
FIG. 8 is a graph showing the relation between ΔRpvs and ΔIp.

FIG. 8 is a graph showing the relation between the internal resistance difference $\Delta Rpvs$ and the pump current difference $\Delta Ip$.

As shown by a straight line L3 of FIG. 8, a range of the internal resistance difference $\Delta Rpvs$ exists within which the relation between the internal resistance difference $\Delta Rpvs$ and the pump current difference $\Delta Ip$ can be approximated by a linear equation (hereinafter referred to as the "approximation possible range"). In FIG. 8, the range of the internal resistance difference $\Delta Rpvs$ between $-10\Omega$ and $+5\Omega$ is the approximation possible range. The slope of the linear equation representing the straight line L3 corresponds to the coefficient a.

Accordingly, the coefficient a in equation (2) can be set by measuring the internal resistance difference $\Delta Rpvs$ and the pump current difference $\Delta Ip$ in the gas sensor 3, and representing the relation between the internal resistance difference $\Delta Rpvs$ and the pump current difference $\Delta Ip$ by a linear equation within the approximation possible range as shown in FIG. 8.

Thus, by performing a simple computation of multiplying the internal resistance difference $\Delta Rpvs$ by the coefficient a, the sensor control apparatus 1 can correct the pump current Ip in consideration of the influence which is exerted on the pump current Ip in the above-described static state. As a result, the processing load of the sensor control apparatus 1 can be reduced.

The sensor used in the above-described embodiment is an oxygen sensor; however, the sensor may be a gas sensor for detecting a gas other than oxygen (for example, NOx). Also, even in the case where an oxygen sensor is used as the sensor, its sensor element is not limited to a sensor element which uses a single cell and detects the concentration of oxygen by a limiting-current method as in the case of the above-described embodiment. For example, the present invention may be applied to a sensor element in which a measurement chamber is disposed between two cells; i.e., an oxygen pump cell having a pair of electrodes and an oxygen concentration detection cell having a pair of electrodes. This sensor element having two cells is driven such that oxygen is pumped out from the measurement chamber or pumped into the measurement chamber by controlling the energization state of the oxygen pump cell so that the electromotive force generated between the electrodes of the oxygen concentration detection cell becomes equal to a target value. As a result, the sensor element can detect the concentration of oxygen over a wide range based on the pump current flowing through the oxygen pump cell.

The function of one component in the above embodiments may be distributed to a plurality of components, or the functions of a plurality of components may be realized by a single component. Part of the configurations of the above embodiments may be omitted. At least part of the configuration of each of the above embodiments may be added to or partially replace the configurations of other embodiments. All modes included in the technical concept defined by the claims appended hereto are embodiments of the present disclosure.

The present disclosure may be realized in various forms other than the above-described sensor control apparatus 1.

For example, the present disclosure may be realized as a system including the sensor control apparatus 1 as a component, a program for causing a computer to function as the sensor control apparatus 1, a non-transitory tangible recording medium, e.g., a semiconductor memory, in which the program is recorded, and a concentration calculation method.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2017-080547 filed Apr. 14, 2017, incorporated herein by reference in its entirety.

What is claimed is:

1. A sensor apparatus which calculates a concentration of a particular gas contained in a gas under measurement using a gas sensor which includes a sensor element and a heater for heating the sensor element, the sensor element including at least one cell having a solid electrolyte body and a pair of electrodes disposed on the solid electrolyte body, the sensor apparatus comprising:
a controller area network (CAN) interface circuit configured to communicate with an engine electronic control unit (ECU);
a control circuit;
a microcomputer configured to communicate with the CAN interface circuit and the control circuit; and
connection terminals configured to communicate with the sensor element and the control circuit;
the microcomputer configured to:
repeatedly obtain resistance information representing an internal resistance value of the solid electrolyte body to thereby obtain a plurality of the internal resistance values comprising a latest obtained internal resistance value and one or more prior obtained internal resistance values and current information representing a concentration detection current value which flows between the pair of electrodes and whose value varies with the concentration of the particular gas; and
correct a latest obtained concentration detection current value, based on the latest obtained internal resistance value, a target internal resistance value, and a resistance change rate,
wherein the target internal resistance value is an internal resistance of the solid electrolyte body corresponding to a target temperature at which the solid electrolyte body is maintained by means of heating by the heater so as to enable the sensor element to detect the concentration of the particular gas,
wherein the resistance change rate is an amount of change in internal resistance per unit time and is calculated based on the plurality of the internal resistance values,
wherein the microcomputer is configured to correct the value of the latest obtained concentration detection current in accordance with the following equation (2):

$$Ipo = Ip - \alpha \times \Delta Rpvs - \beta \frac{dRpvs}{dt} \qquad (2)$$

wherein Ip represents the value of the latest obtained concentration detection current represented by the current information, $\Delta Rpvs$ represents a difference obtained by subtracting the target internal resistance value from the value of the latest obtained internal resistance represented by the resistance information, $dRpvs/dt$ represents the resistance change rate, Ipo represents the corrected value of the concentration detection current, and $\alpha$ and $\beta$ represent coefficients set in advance as constants.

2. A sensor unit comprising:
a gas sensor which includes a sensor element and a heater for heating the sensor element, the sensor element including at least one cell having a solid electrolyte body and a pair of electrodes disposed on the solid electrolyte body; and
the sensor apparatus as claimed in claim 1.

3. A sensor unit comprising:
a gas sensor which includes a sensor element and a heater for heating the sensor element, the sensor element including at least one cell having a solid electrolyte body and a pair of electrodes disposed on the solid electrolyte body; and
a sensor apparatus,
wherein the sensor apparatus is configured to calculate a concentration of a particular gas contained in a gas under measurement using the gas sensor,
wherein the sensor apparatus comprises a processor configured to:
repeatedly obtain resistance information representing an internal resistance value of the solid electrolyte body to thereby obtain a plurality of the internal resistance values comprising a latest obtained internal resistance value and one or more prior obtained internal resistance values and current information representing a concentration detection current value which flows between the pair of electrodes and whose value varies with the concentration of the particular gas; and
correct a latest obtained concentration detection current value, based on the latest obtained internal resistance value, a target internal resistance value, and a resistance change rate,
wherein the target internal resistance value is an internal resistance of the solid electrolyte body corresponding to a target temperature at which the solid electrolyte body is maintained by means of heating by the heater so as to enable the sensor element to detect the concentration of the particular gas,
wherein the resistance change rate is an amount of change in internal resistance per unit time and is calculated based on the plurality of the internal resistance values,
wherein the processor is configured to correct the value of the latest obtained concentration detection current in accordance with the following equation (2):

$$Ipo = Ip - \alpha \times \Delta Rpvs - \beta \frac{dRpvs}{dt} \qquad (2)$$

wherein Ip represents the value of the latest obtained concentration detection current represented by the current information, $\Delta Rpvs$ represents a difference obtained by subtracting the target internal resistance value from the value of the latest obtained internal resistance represented by the resistance information, dRpvs/dt represents the resistance change rate, Ipo represents the corrected value of the concentration detection current, and a and β represent coefficients set in advance as constants.

\* \* \* \* \*